United States Patent
Fukuta et al.

(10) Patent No.: US 8,571,575 B2
(45) Date of Patent: Oct. 29, 2013

(54) RECORDING MEDIUM FOR STORING POSITION ESTIMATION PROGRAM, POSITION ESTIMATION DEVICE, AND POSITION ESTIMATION METHOD

(75) Inventors: Shigeki Fukuta, Kawasaki (JP); Kazuo Sasaki, Kawasaki (JP); Itaru Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/325,954

(22) Filed: Dec. 14, 2011

(65) Prior Publication Data

US 2012/0172053 A1 Jul. 5, 2012

(30) Foreign Application Priority Data

Dec. 29, 2010 (JP) ................. 2010-294526

(51) Int. Cl.
*H04W 24/00* (2009.01)
(52) U.S. Cl.
USPC .............. 455/456.1; 455/404.2; 455/440; 455/456.6
(58) Field of Classification Search
USPC .......... 455/456.1, 404.2, 440, 456.6, 457
See application file for complete search history.

(56) References Cited

U.S. PATENT DOCUMENTS

| | | | |
|---|---|---|---|
| 5,724,660 A * | 3/1998 | Kauser et al. | 455/456.2 |
| 5,930,717 A | 7/1999 | Yost et al. | |
| 6,266,014 B1 * | 7/2001 | Fattouche et al. | 342/450 |
| 6,970,796 B2 | 11/2005 | Tashev | |
| 7,487,056 B2 | 2/2009 | Tashev | |
| 2007/0205942 A1 * | 9/2007 | Xie et al. | 342/357.13 |
| 2012/0028652 A1 * | 2/2012 | Wirola et al. | 455/456.1 |

FOREIGN PATENT DOCUMENTS

| | | |
|---|---|---|
| JP | 11-271418 | 10/1999 |
| JP | 2001-512940 | 8/2001 |
| JP | 2003-083744 | 3/2003 |
| JP | 2005-249789 | 9/2005 |
| JP | 2008-281942 | 11/2008 |
| WO | WO-99/07177 | 2/1999 |

OTHER PUBLICATIONS

Partial English-language Translation of JP-11-271418 (previously cited in an IDS filed on Dec. 14, 2011).

* cited by examiner

*Primary Examiner* — Meless N Zewdu
*Assistant Examiner* — Michael Nguyen
(74) *Attorney, Agent, or Firm* — Fujitsu Patent Center

(57) ABSTRACT

A computer executes processing of acquiring, by using a positioning unit to output error region information indicating an ellipse-shaped error region represented by a position acquired from positioning performed by receiving a signal from a plurality of transmitters and a measurement error of the position, a plurality of pieces of the error region information by performing the positioning a plurality of times, processing of extending the error region indicated by each piece of the acquired error region information in a major axis direction, and processing of estimating a position of a positioning target based on an intersect region at which the extended error regions intersect with one another.

16 Claims, 18 Drawing Sheets

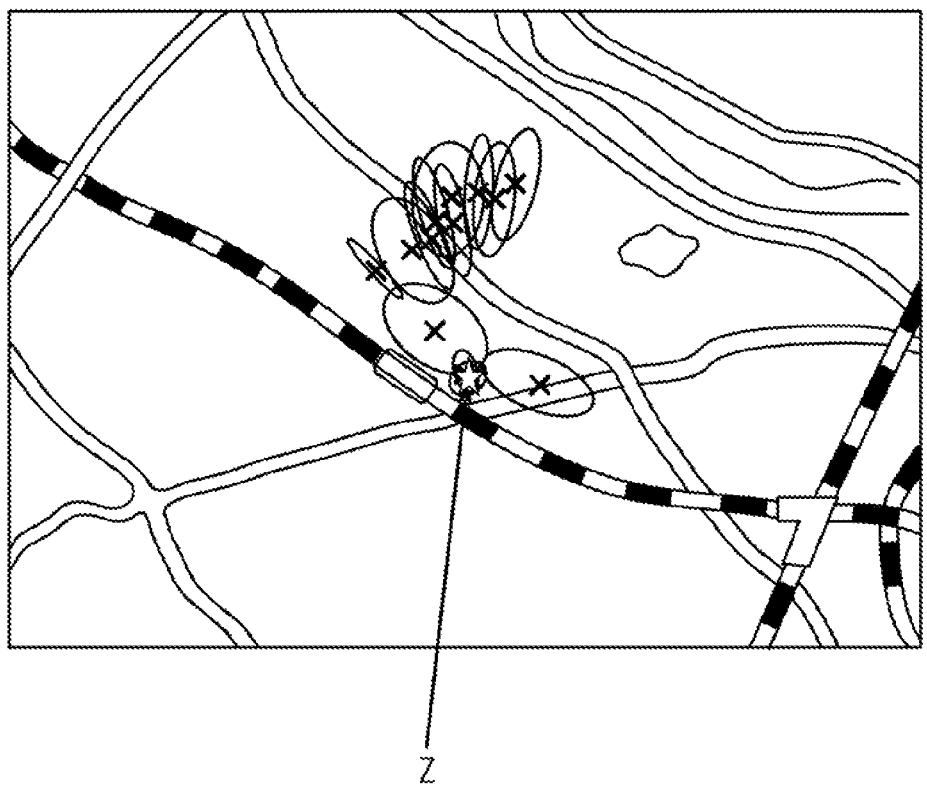
F I G. 1

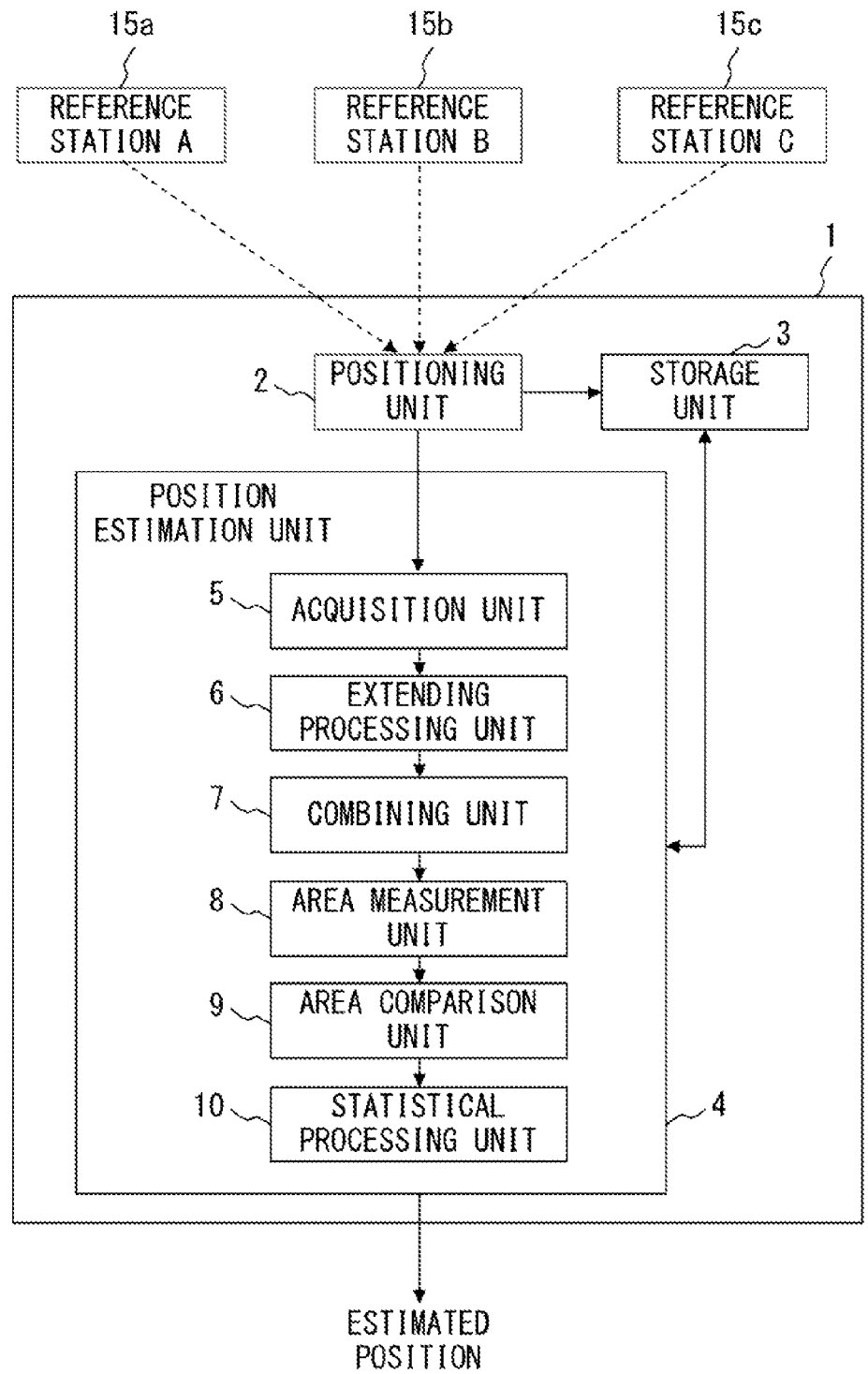
F I G. 2

| CENTRAL COORDINATE | | | ERROR | | | ACQUISITION TYPE | ACQUISITION DATE |
|---|---|---|---|---|---|---|---|
| LATITUDE | LONGITUDE | ALTITUDE | SEMI-MAJOR AXIS | SEMI-MINOR AXIS | INCLINATION | | |
| N35.582 | E139.642 | 0m | 112m | 24m | 129° | GPS | 2009/11/4 12:24 |
| N35.596 | E139.661 | 0m | 120m | 16m | 43° | GPS | 2009/11/4 11:45 |

| CENTRAL COORDINATE | | | ERROR | | | | ACQUISITION TYPE | ACQUISITION DATE |
|---|---|---|---|---|---|---|---|---|
| LATITUDE | LONGITUDE | ALTITUDE | AXIS WIDTH 1 | INCLINATION 1 | AXIS WIDTH 2 | INCLINATION 2 | | |
| N35.580 | E139.644 | 0m | 24m | 129° | 16m | 43° | COMBINED | 2009/11/04 12:24:32<br>2009/11/04 11:45:11 |

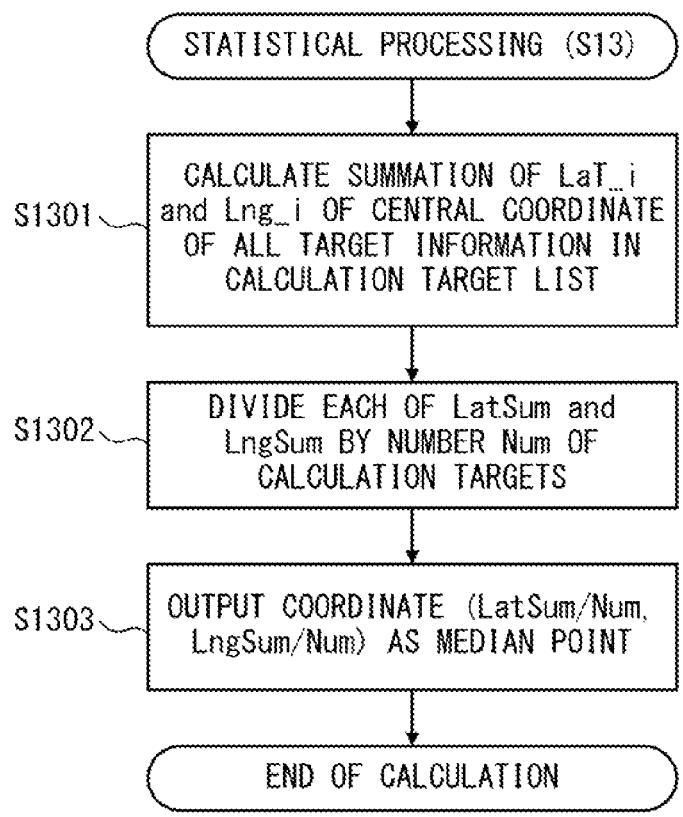
F I G. 8

| LATITUDE OF CENTER POSITION | LONGITUDE OF CENTER POSITION | · · · | ERROR AREA |
|---|---|---|---|
| Lat_1 | Lng_1 | · · · | S1 |
| Lat_2 | Lng_2 | · · · | S2 |
| | | · · · | |
| Lat_i | Lng_i | · · · | Si |
| | | · · · | |
| Lat_n | Lng_n | · · · | Sn |

F I G. 1 0

| CENTER POINT LATITUDE | CENTER POINT LONGITUDE | ... | ERROR AREA | ACQUISITION TYPE | CORRECTED ERROR AREA |
|---|---|---|---|---|---|
| Lat_1 | Lng_1 | ... | S1 | GPS | Srev_1 = S1 × k |
| Lat_2 | Lng_2 | ... | S2 | COMBINED | Srev_2 = S2 × l |
| ... | ... | ... | ... | ... | ... |
| Lat_i | Lng_i | ... | Si | COMBINED | Srev_i = Si × l |
| ... | ... | ... | ... | ... | ... |
| Lat_n | Lng_n | ... | Sn | GPS | Srev_n = Sn × k |

FIG. 12

| CENTER POINT LATITUDE | CENTER POINT LONGITUDE | ... | ERROR AREA | ACQUISITION TYPE | DISTANCE FROM ORIGINAL REGIONS | CORRECTED ERROR AREA |
|---|---|---|---|---|---|---|
| Lat_1 | Lng_1 | ... | S1 | GPS | 0 | Srev_1 = S1 |
| Lat_2 | Lng_2 | ... | S2 | COMBINED | D2 | Srev_2 = S2 × D2 |
| ... | ... | ... | | | | |
| Lat_i | Lng_i | ... | Si | COMBINED | Di | Srev_i = Si × Di |
| ... | ... | ... | | | | |
| Lat_n | Lng_n | ... | Sn | GPS | 0 | Srev_n = Sn |

F I G. 1 4

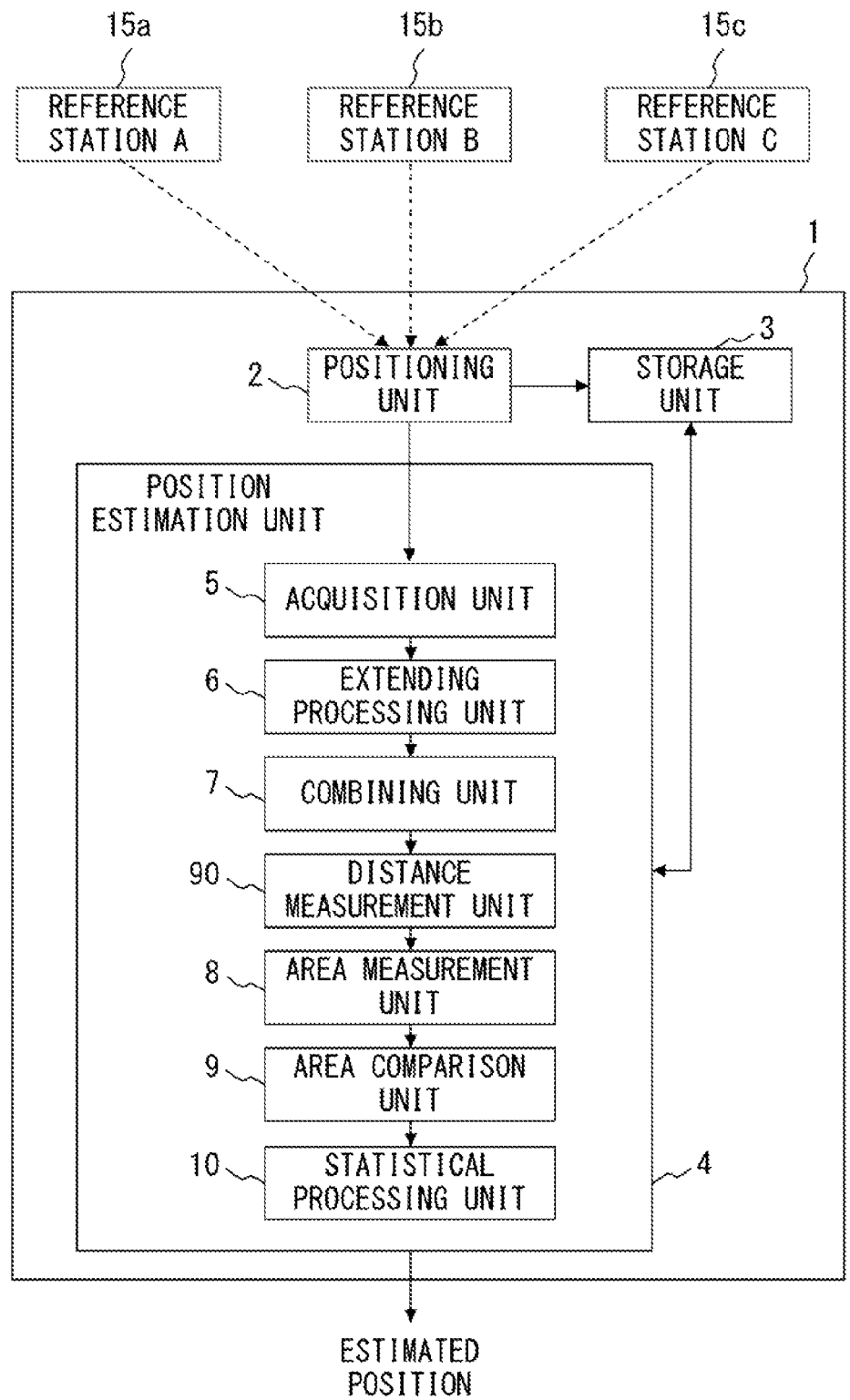
F I G. 1 5

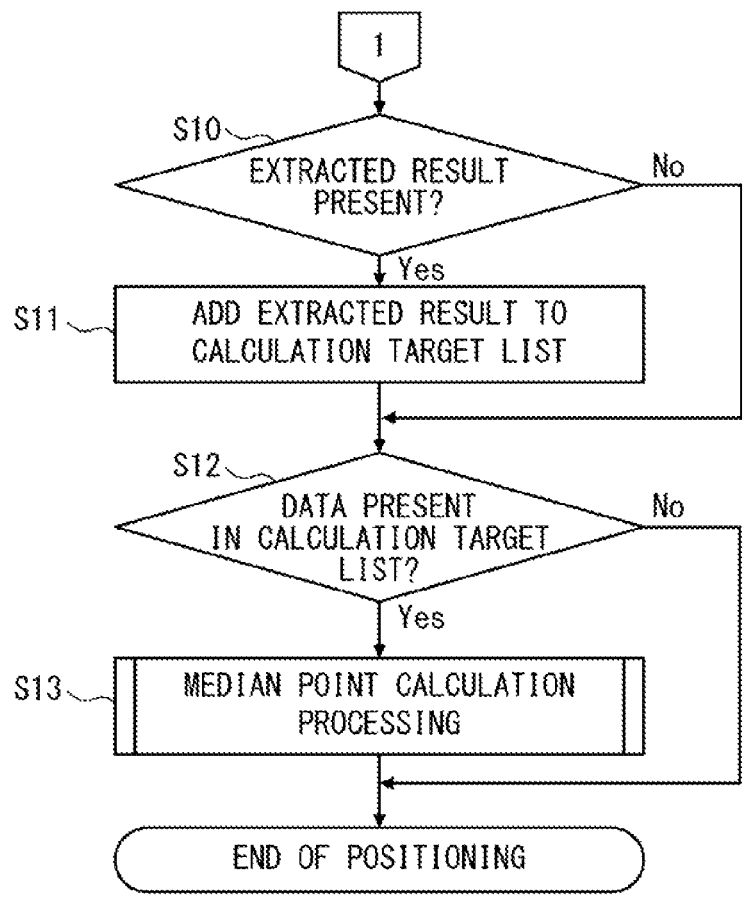
F I G. 16B

RECORDING MEDIUM FOR STORING POSITION ESTIMATION PROGRAM, POSITION ESTIMATION DEVICE, AND POSITION ESTIMATION METHOD

CROSS-REFERENCE TO RELATED APPLICATIONS

This application is based upon and claims the benefit of priority of the prior Japanese Patent Application No. 2010-294526, filed on Dec. 29, 2010, the entire contents of which are incorporated herein by reference.

FIELD

The technology discussed herein is related to a technology of measuring a distance from a reference point to a positioning target and acquiring position information of the target.

BACKGROUND

Methods of acquiring position information, particularly global measurement systems that use for example GPS (Global Positioning System) satellites, have been in widespread use. The positioning methods include for example a method of using wireless base stations on the ground in addition to the method using GPS satellites. Both of the positioning methods measure a distance from plural reference points placed at clearly identified positions to a positioning target and calculate a position of the positioning target by using a three-point method.

At that time, the distance from the positioning target to each of the reference points, which is regarded as base information, includes errors caused by positioning methods and positioning environment. Examples of the possible causes of these errors are the following. A first possible cause is a positioning sensor detecting a reflected wave of a reference radio wave, resulting in misidentification of a distance from the positioning target to the reference point as being longer than the actual distance. Secondly, when radio waves from the reference points are received by using a positioning sensor, the reception time and intensity of the radio waves may not be accurate due to a noise source including the same frequency.

Such influence ultimately appears as an error in the measurement result. As a result, the positioning sensor outputs a position that is different from the actual position. This error varies from several meters to several kilometers. In view of this, the following technologies are examples of the technologies to improve the measurement precision.

The following is the first technology. Firstly, a question signal is transmitted from a wireless station A that is placed at a clearly identified position, and a wireless station C that is placed at an unidentified position transmits a response signal. The response signal from wireless station C is received by wireless stations A and B placed at clearly identified positions, and an ellipse-shape is calculated from position data based on a transmission time of the question signal and a reception time of the response signal in a wireless station B placed at an identified position. In addition, a hyperbolic curve is obtained from the difference in the position data based on the reception time of the response signal from the wireless station C between the wireless station A and the wireless station B, both being placed at identified positions. Afterwards, two intersections of the hyperbolic curve and the ellipse are obtained. Based on the arrival direction of the radio wave, one of the intersections is determined to be a position of the wireless station C placed at an unidentified position.

The following is the second technology. One set of initial orientation data including plural orientation estimations is generated, and the workload is divided into a certain number of overlapping regions. Each of the orientation estimations is assigned to one or a plurality of any corresponding overlapping regions to form one or a plurality of clusters of the orientation estimations in one or plural overlapping regions, and a position of an object represented by each cluster of orientation estimations is estimated. By comparing the positions of the objects estimated in clusters in overlapping regions, whether or not any of the objects is an overlapping object is determined, and the overlapping objects are deleted. The positions of the remaining estimated objects are provided to generate a set of position estimations. The set of position estimations represents a set of orientation estimations, which is improved compared with the set of initial orientation estimations.

As another technology, there is a technology of correcting position and orientation information of a camera from a deflection between a captured image of a construction and prerecorded 3D data of the construction. With this technology, the positioning precision is improved without the need to place a number of reference points.

When positioning a current position of a mobile terminal with GPS, there is a positioning sensor in which an error range can be obtained. At that time, the error region of positioning of the mobile terminal is represented by an ellipse-shaped range involving a semi-major axis error, a semi-minor axis error, and an angle of the major axis.

SUMMARY

A non-transitory computer-readable portable storage medium for storing a position estimation program that estimates a position of a positioning target causes a computer to execute the following processing. A measurement unit receives signals from a plurality of transmitters and outputs error region information indicating an ellipse-shaped error region represented by a position acquired from the positioning and a measurement error of the position. The computer acquires a plurality of pieces of the error region information acquired by positioning performed plural times by using the measurement unit. The computer extends the error region indicated by each piece of the acquired error region information in a major axis direction. The computer estimates the position of the positioning target based on an intersection region in which the extended error regions intersect with one another.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram of an actual position at the time of positioning and an error region acquired from a positioning result of the position indicated on a map;

FIG. 2 illustrates an example of a configuration of a position estimation device in the first embodiment;

FIG. 4 illustrates an example of error region information generated by a positioning sensor;

FIG. 6 illustrates an example of combined region information;

FIG. 8 illustrates an example of statistical processing in the first embodiment;

FIG. 10 illustrates an example of a calculation target list in process in the second embodiment (Example 1);

FIG. 12 illustrates an example of a calculation target list in process in the second embodiment (Example 2);

FIG. 14 illustrates an example of a calculation target list in process in the second embodiment (Example 3);

FIG. 15 illustrates an example of a configuration of the position estimation device in the third embodiment;

FIG. 16B illustrates a flow (2) of position estimation processing in the third embodiment.

DESCRIPTION OF EMBODIMENTS

Figure 3:
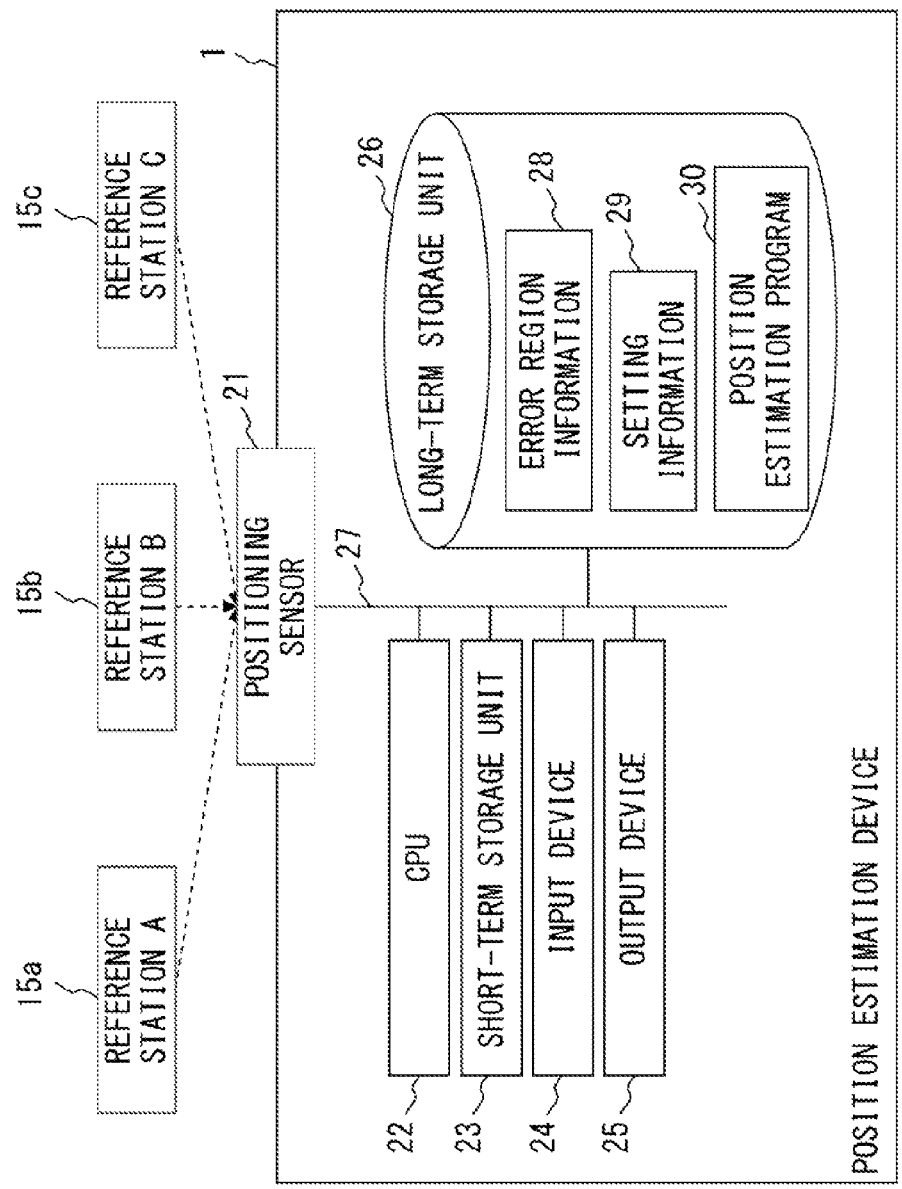
FIG. 3 illustrates an example of a hardware configuration of the position estimation device in the first embodiment.

As described above, there are positioning sensors that can obtain an error range by identifying the current position with the use of a GPS. At that time, the error range of the identified position is represented by a range of ellipses involving an error in the semi-major axis, an error in the semi-minor axis, and the major axis angle. Such an error range is estimated on the basis of the radio wave conditions at the time of positioning.

However, it is difficult to make a precise estimate of the errors based on the radio wave conditions. For example, the positioning sensor may recognize a range smaller than the difference between the actual position of a positioning target and a position of the measuring target obtained as a result of the measurement and may output the range as an error region. Assuming that the positioning target is present within the error region output from the positioning sensor, as described above, then when the actual error is larger than the estimated error, the positioning system may misidentify the actual position.

On the other hand, it is possible to improve the precision of the measurement by observing a fixed point a plural number of times and select more precise measurement result or by statistical processing of the measurement results of observing a plural number of times. For example, in the second technology described above, plural pieces of orientation data are clustered and statistical processing is performed a plural number of times for each cluster to calculate estimated positions. A position having the highest concentration of the estimated positions of all clusters is the ultimate measurement result of the estimated position.

However, in this technology, a large number of pieces of positioning data are obtained. Although the precision of positioning improves as those pieces of data become concentrated, the number of times of positioning also increases and the time taken to acquire the positioning result is longer. Accordingly, it is desirable to acquire a measurement result with a higher precision within a range of the positioning result acquired from a positioning sensor.

In view of the above, the present specification provides an explanation of a technology for estimating a position of a positioning target in a precise manner by effectively using measurement error information.

When positioning is performed with the three-point method, the measurement error is included in the position information acquired from the reference station. At that time, the measurement error is represented as an ellipse-shaped region (error region) around the acquired position information. The reason that the error region takes an elongated ellipse shape might be the following. The first reason is that when the measurement position is identified by acquiring an intersection of three spheres based on the distance from each of the reference stations, it is possible for the distances from respective reference stations to become a radius of a sphere around each reference station and for the errors in the distances to become the thickness of the surface of the sphere. Next, when a thickness of one surface of the sphere increases as a result of an error generated in a distance from a reference station, the error region portion that is an intersection region of the three spheres swells in a diameter direction of the sphere with a large error, and the error region portion becomes elongated.

When this error region is illustrated on a map, an ellipse-shaped error region can be obtained. The ellipse-shaped error region can be obtained as a shape based on a portion of a rectangular parallelepiped region obtained as an intersection region of three spheres, which is in contact with a surface on the ground. Here, the length of the largest error from the reference station forms a longitudinal direction of the rectangular parallelepiped. It should be noted that the shape of the portion of the region in the rectangular parallelepiped in contact with the surface on the ground changes in accordance with the angle that the rectangular parallelepiped intersects with the surface of the ground.

Accordingly, the major axis direction of the error region can be obtained based on the shape of the portion of the region of the rectangular parallelepiped obtained as an intersection region of three spheres, which is in contact with the surface of the ground, by using an error obtained based on a distance measuring signal received from plural reference stations. At that time, in many cases, the size of the obtained errors is larger than the actual error. On the other hand, the minor-axis direction of the error region is a result determined from the smallest error of the errors obtained on the basis of the distance measuring signal received from plural reference stations, and for that reason, the error estimation is likely to be more precise than in the major axis direction.

FIG. 1 is a diagram of an actual position at the time of positioning and an error region acquired from a positioning result of the position indicated on a map. In FIG. 1, positioning a position Z (actual position) indicated by a start is performed a plural number of times at some time intervals. Positions acquired as measurement results (positions indicated by "X") and ellipse-shaped error regions around the acquired positions are acquired in every positioning. In this manner, the positioning results are different in every positioning, and it is unlikely that the actual position will be precisely acquired.

However, when the positioning is performed a plural number of times at some time intervals, the direction of error of the major axis is oriented in the direction of the actual position in many cases, as illustrated in FIG. 1.

In view of this, in the following embodiment, the error regions acquired by a plural number of times of positioning at the same position are extended in the major axis direction, and a portion at which the extended regions overlap one another is regarded as a new error region. A median point of a cluster of median points of the error regions acquired from the measurement and median points of the new error regions is estimated as a position of the positioning target. It should be noted that although the same position refers to a single position when the positioning target remains stationary, it includes the following case. In a case in which the positioning target moves at an interval of positioning, but the distance of the movement is sufficiently short with respect to the measurement error, such a case is regarded as the positioning target remaining stationary, and the case is treated as the same position.

In the following description, the embodiments are explained.

First Embodiment

FIG. 2 illustrates an example of a configuration of a position estimation device of the first embodiment. The position estimation device 1 may be a positioning target device itself, or a device included in the positioning target device.

The position estimation device 1 receives a distance measuring signal from, for example, three reference stations, reference stations 15a, 15b, and 15c, each of which is located at a clearly identified position. The position estimation device 1 performs positioning of the position estimation device 1 itself by using the received distance measuring signal. It should be noted that the number of the reference stations is not limited to three.

The position estimation device 1 includes a positioning unit 2, a storage unit 3, and a position estimation unit 4. The positioning unit 2 receives the distance measuring signal from the reference stations 15a, 15b, and 15c. The positioning unit 2 uses the received distance measuring signal and measures the distance from transmitters of the reference stations 15a, 15b, and 15c and others to a position of the positioning unit 2 that is a positioning target by using the arrival time or intensity of radio waves. Afterwards the positioning unit 2 uses the three-point method to calculate the position of the positioning unit 2 (measurement position) based on the measured distance. At that time the positioning unit 2 also calculates a measurement error from the radio wave conditions at the time of the measurement. Here, "measurement error" refers to the length of the major axis and the length of the minor axis of the ellipsoidal region around the measurement position. In addition, in the following description, the measured position is referred to as a "central coordinate" of the error region or "center point".

The storage unit 3 stores the central coordinate and the error information calculated in the positioning unit 2 as error region information.

The position estimation unit 4 performs the following processing by using the error region information obtained as a result of positioning being performed a plurality of times with respect to a single position. In other words, the position estimation unit 4 extends the error region (a region represented by the central coordinate and the error information) obtained for each piece of error region information in a direction of a major axis. The position estimation unit 4 combines the extended error regions and obtains a region in which the extended error regions intersect one another as a combined region. The position estimation unit 4 estimates the position of the positioning target by using the error region and the combined region.

The position estimation unit 4 includes an acquisition unit 5, an extending processing unit 6, a combining unit 7, an area measurement unit 8, an area comparison unit 9, and a statistical processing unit 10.

The acquisition unit 5 acquires the error region information from the storage unit 3. The extending processing unit 6 generates an extended region that is created by extending the error region designated by the error region information in the direction of a major axis.

The combining unit 7 is an example of an intersection region acquisition unit. The combining unit 7 selects two from the quantity n of the extended regions and calculates a portion in which the two extended regions intersect with one another (combined region). The combining unit 7 performs this processing on all of the combinations (combinations of n*(n−1)/2) of the selections of two extended regions from the quantity n of the extended regions.

The area measurement unit 8 calculates an area of each of the calculated combined regions. The area comparison unit 9 compares the area of each of the calculated combined regions with a threshold, and selects a combined region that has an area that is equal to or smaller than the threshold.

The statistical processing unit 10 serves as an estimation unit and estimates the position of the positioning target based on the combined regions. In other words, the statistical processing unit 10 performs statistical processing of a cluster of coordinates indicating the positions of target regions (error region and combined region), and the coordinates acquired by the statistical processing are output as an estimated position of the positioning target. For example, a coordinate of a median point is acquired from each of the target regions, and a median point (average), weighted average, standard deviation, and weighted standard deviation of these coordinates can be calculated by the statistical processing. However, the processing is not limited to the above.

It should be noted that even though the positioning unit 2, the storage unit 3, and the position estimation unit 4 are installed in the position estimation device 1 in FIG. 2, the configuration is not limited to the above. For example, a functional unit other than the positioning unit 2 that directly receives signals from the reference stations may be implemented in other aggregating and counting devices or in other devices such as an online server. In such a case, a mechanism that transmits information from the sensors to the position estimation unit 4 by using appropriate communication means is required separately.

FIG. 3 illustrates an example of the hardware configuration of the position estimation device in the second embodiment. The position estimation device 1 includes, for example, a positioning sensor 21, a CPU 22, a short-term storage unit 23, an input device 24, an output device 25, a long-term storage unit 26, and a bus 27.

The CPU (Central Processing Unit) 22 controls the operations of the entire position estimation device 1. The short-term storage unit 23 is a volatile storage unit such as RAM (Random Access Memory) that temporarily stores the data in process.

The positioning sensor 21 is an example of the positioning unit 2. The positioning sensor 21 receives radio waves including the distance measuring signal from three reference stations of the reference stations 15a to 15c. The reference stations are transmitters transmitting radio waves including a distance measuring signal, and include, for example, satellite or base stations arbitrarily placed anywhere on earth, above the ground or on bodies of water.

The positioning sensor 21 measures a distance from the reference stations 15a to 15c to the position of the position estimation device 1 by using the arrival time or intensity of carrier waves, and calculates the position of the position estimation device 1 by using the three-point method. At that time, the positioning sensor 21 calculates the measurement error from the radio wave conditions at the time of the measurement.

The information of the central coordinate of the error region (central coordinate information) and the information of the measurement error (error information) are stored as error region information 28 in for example the long-term storage unit 26.

The input device 24 is an input device such as a keyboard, a mouse, a touch panel, a microphone, or a communication device. The output device 25 is an output device such as a display, a printer, a speaker, or a communication device. Alternatively, the input device and the output device can be realized by a single device as in a touch panel display.

It should be noted that the position estimation device 1 may not include the input device 24 or the output device 25. For example, the position estimation device 1 may have a configuration of receiving a setting from an online server and transmitting the measurement result to the server without having a keyboard or the like or a display or the like. In this case, a network device (communication device) serves as an input/output device.

The long-term storage unit 26 is a non-volatile storage device such as a hard disk drive or a flash memory. The long-term storage unit 26 may for example store error region information 28, setting information 29, and a position estimation program 30.

The error region information 28 is information including central coordinate information and error information calculated by the positioning sensor 21, as described above. The setting information 29 is initial value information and threshold information used in the processing described later and is stored in the long-term storage unit 26 in advance. The position estimation program 30 is a program that causes the CPU 2 to function as a position estimation unit 4.

FIG. 4 illustrates an example of the error region information generated by the positioning sensor. The error region information 28 includes "central coordinate" 41 and "error" 45. "Central coordinate" 41 is information representing the central coordinate of the error region such as "latitude" 42, "longitude" 43, and "altitude" 44. "Error" 45 is information representing the size and shape of the error regions calculated by the positioning sensor 21 such as "semi-major axis" 46, "semi-minor axis" 47, and "inclination" 48. Here, "inclination" 48 indicates the inclination (angle) of the major axis with respect to the meridians. Detailed explanation of the size and the shape of the error regions is provided with reference to FIG. 5.

The error region information 28 may further include information such as "acquisition type" 49 and "acquisition date" 50. "Acquisition type" 49 represents a positioning method such as positioning using a GPS or positioning using a wireless LAN base stations. "Acquisition date" 50 represents the date when the distance measuring signal is acquired from the reference stations 15a to 15c and the position is identified.

Figure 5:
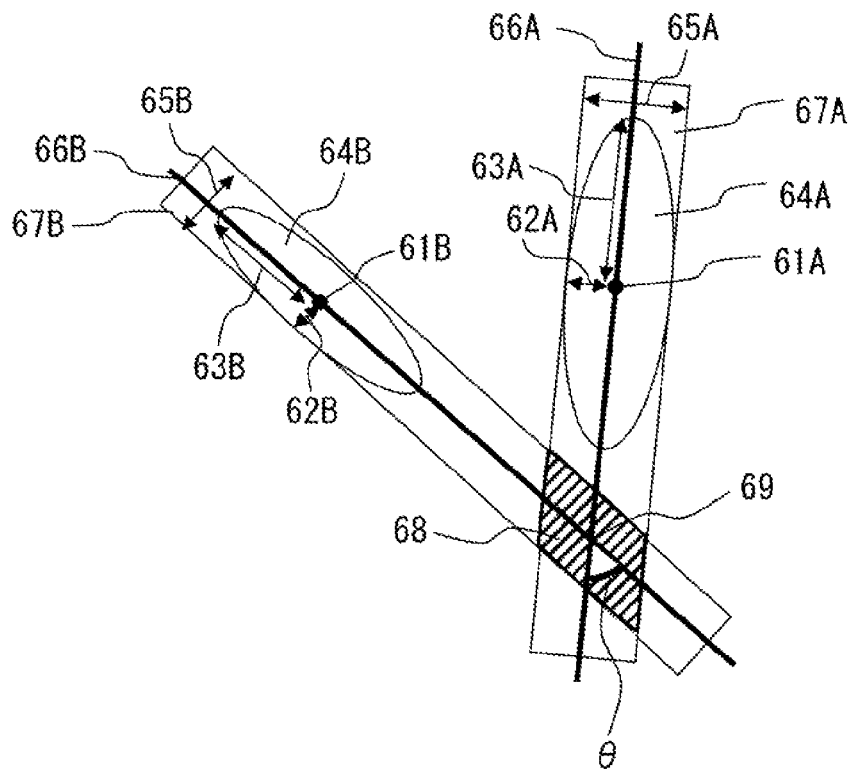
FIG. 5 is an example of a combined region acquired by combining extended regions.

FIG. 5 illustrates an example of combined regions acquired by combining the extended regions. For example, of the error region information 28 acquired when positioning of one point is performed a plurality of times, two pieces of the error region information are selected. In such a case, one piece of the error region information is represented as the error region information 28A, and the other piece of the error region information is represented as the error region information 28B. It should be noted that in the following description, an index A is added to the information relating to the error region information indicated by the first record in FIG. 4 and an index B is added to the information relating to the error region information indicated by the second record, for convenience of explanation.

Regarding the error region information 28A, a position indicated by "central coordinate" 41A ("latitude" 42A=N35.58, "longitude" 43A=E139.64) is represented as the central coordinate 61A in FIG. 5. A region represented by "semi-minor axis" 47A=24(m) and "semi-major axis" 46A=112(m) around the central coordinate 61A is an ellipsoidal error region 64A indicated by the error region information 28A. The extending processing unit 6 generates a band-like region (extended region 67A) by fixing the central coordinate 61A and a minor axis width 65A (semi-minor axis×2) and extending the region in a major axis direction 66A.

On the other hand, regarding the error region information 28B, the coordinate indicated by the central coordinate 41B ("latitude" 42B=N35.59, "longitude" 43A=E139.66) is represented as the central coordinate 61B in FIG. 5. A region represented by "semi-minor axis" 47B=16(m) and "semi-major axis" 46B=120(m) around the central coordinate 61B is an ellipsoidal error region 64B indicated by the error region information 28B. The extending processing unit 6 generates a band-like region (extended region 67B) by fixing the central coordinate 61B and a minor axis width 65B (semi-minor axis×2) and extending a major axis 66B.

The combining unit 7 combines the extended region 67A and the extended region 67B in the same coordinate system. The combining unit 7 afterwards detects a parallelogram region (combined region 68) in which the extended region 67A and the extended region 67B overlap one another, as illustrated in FIG. 5.

The combining unit 7 acquires as combined region information the central coordinate 69 of the combined region 68 represented as an intersection of the major axis 66A and the major axis 66B, the axis width 65A and inclination of the major axis 66A, and the axis width 65B of the major axis 66B. Here, the inclination of the major axis refers to the inclination (angle) of the major axis with respect to the meridians.

FIG. 6 illustrates an example of the combined region information. The combining unit 7 stores the acquired combined region information 70 in the storage unit 3. The combined region information includes "central coordinate" 71 and "error" 75. "Central coordinate" 71 includes information representing the central coordinate 69 of the combined region 68 such as "latitude" 72, "longitude" 73, and "altitude" 74.

"Error" 75 includes information of "axis width 1" 76, "inclination 1" 77, "axis width 2" 78, and "inclination 2" 79. The axis width 65A of the major axis direction 66A is stored in "axis width 1" 76. The inclination (angle) of the major axis 66A with respect to the meridians is stored in "inclination 1" 77. The axis width 65B of the major axis direction 66B is stored in "axis width 2". The inclination (angle) of the major axis 66B with respect to the meridians is stored in "inclination 2" 79.

The combined region information 70 may further include information such as "acquisition type" 80 and "acquisition date" 81. "Acquisition type" 80 stores "combined", which represents that the information has been acquired by processing in the combining unit. "Acquisition date" 81 stores the contents of "acquisition date" 50 in each of two pieces of the error region information 28A and 28B that are the basis of the combination.

Figure 7A:
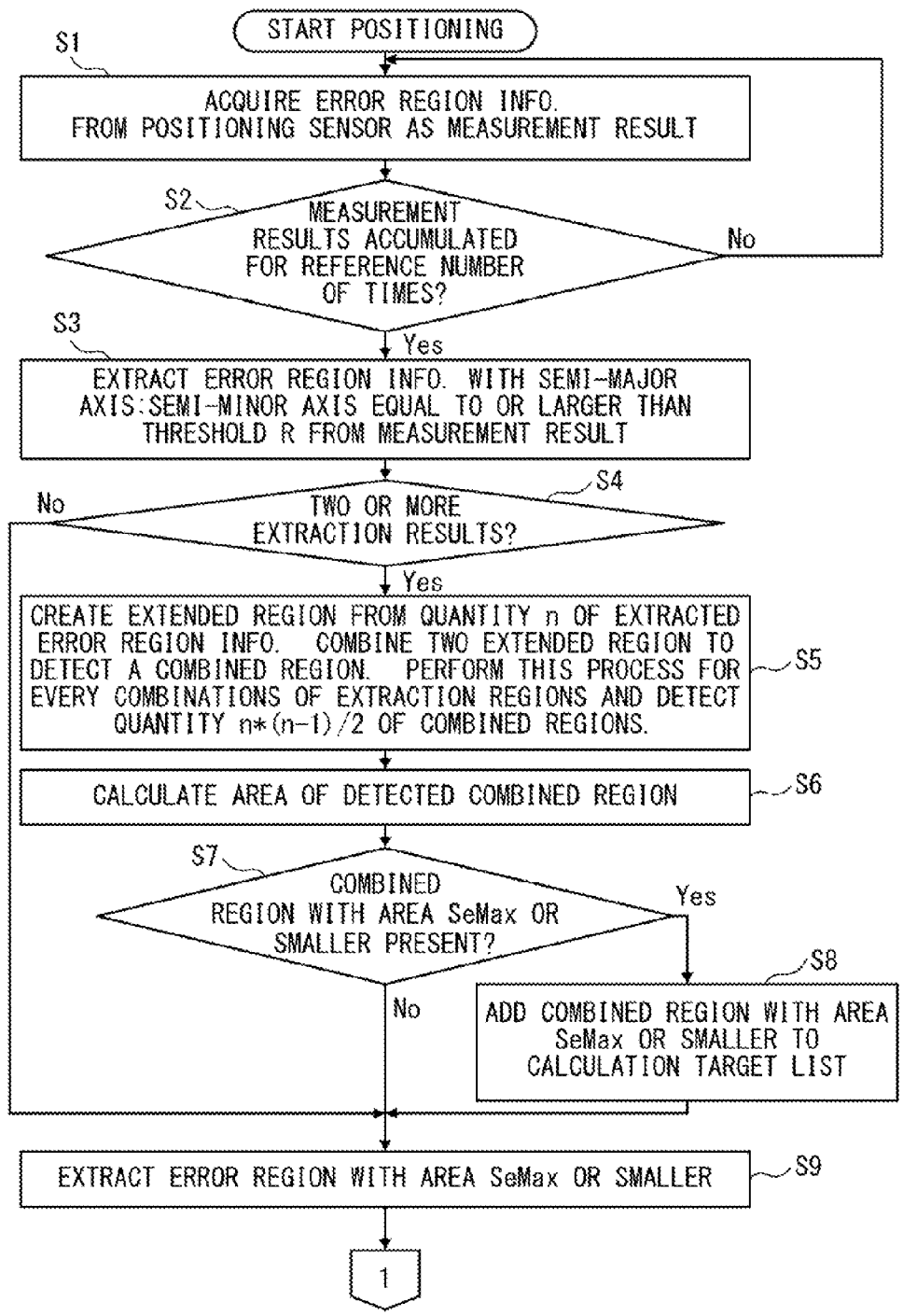
FIG. 7A illustrates a flow (1) of position estimation processing in the first embodiment.
Figure 7B:
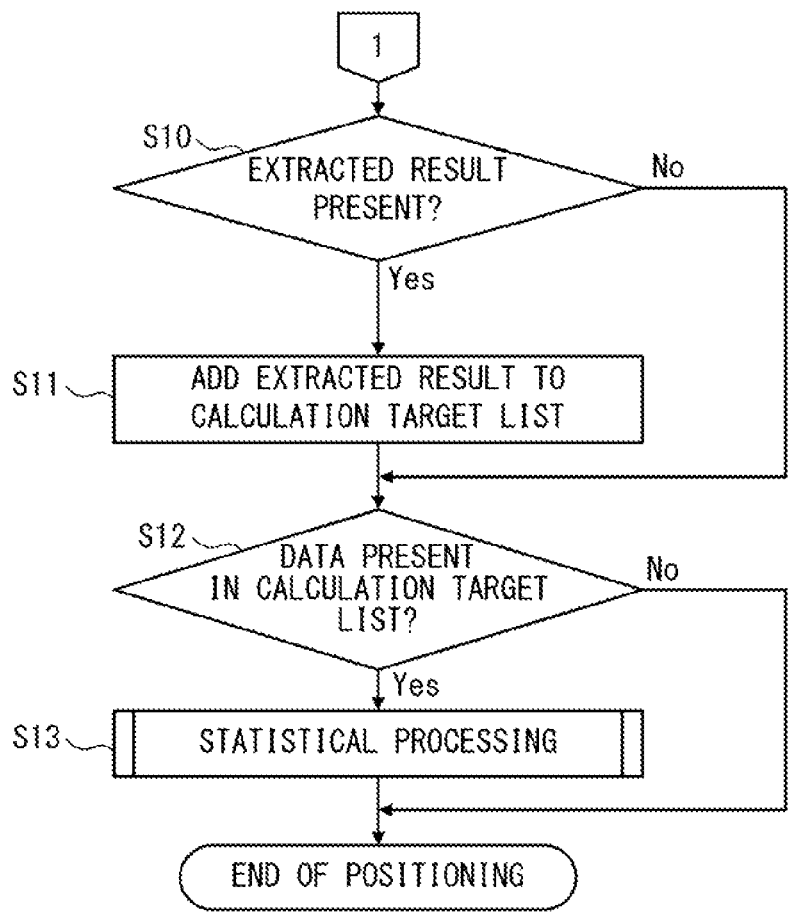
FIG. 7B illustrates a flow (2) of position estimation processing in the first embodiment.

FIG. 7A and FIG. 7B illustrate a flow of position estimation processing in the first embodiment. The CPU 22 reads out the position estimation program 30 form the long-term storage unit 26 and executes the position estimation program 30.

Firstly, the CPU 22 activates the positioning sensor 21 at fixed intervals from the time of the positioning start, and acquires error region information 28 from the positioning sensor 21 as a positioning result (S1). Regarding this acquisition interval, the acquisition may be performed every prescribed time period, the frequency of acquisition may be increased during a time period in which a lower amount of the error information is available, or the frequency of acquisition may be changed in accordance with the importance or the amount of information acquired from other sensors. The CPU 22 stores the acquired error region information 28 in the short-term storage unit 23 and the long-term storage unit 26.

The CPU 22 repeats the processing in S1 until the positioning results of a reference number of times are accumulated (S2). The reference number of times is included in the setting information 29 and is stored in the long-term storage unit 26 in advance. When the positioning results of more than a prescribed reference number of times can be acquired ("Yes" in S2), the CPU 22 functions as a positioning processing unit 4 (the acquisition unit 5, the extending processing unit 6, the combining unit 7, the area measurement unit 8, the area comparison unit 9, the statistical processing unit 10) and starts generating the combined region.

The acquisition unit 5 extracts the error region information 28 having error information in which the ratio of "semi-major axis":"semi-minor axis" is a threshold R or higher from among the pieces of error region information 28 stored in the short-term storage unit 23 or the long-term storage unit 26 (S3). This processing in S3 is performed for the following reason. There may be cases in which a desirable estimation result cannot be acquired since the major axis direction is not clear and the axial inclination error is large in the error region information of a nearly circular region. In other words, the processing in S3 is performed because a more desirable estimation result is expected to be acquired from an error region with an ellipse shape elongated to a certain extent (the major axis is longer in a certain proportion with respect to the minor axis). It should be noted that the threshold R is included in the setting information 29 and is stored in the long-term storage unit 26 in advance.

The acquisition unit 5 may extract, from the error region information 28 stored in the short-term storage unit 23 or the long-term storage unit 26, the error region information 28 having error information in which the semi-minor axis is a certain value Smin or smaller and the semi-major axis is a certain value Smax or larger. In this case, Smax and Smin are included in the setting information 29 and are stored in the long-term storage unit 29 in advance.

When only one piece or less of the error region information 28 is extracted in S3, the process proceeds to S9. When two or more pieces of error region information 28 are extracted in S3, the extending processing unit 6 generates the extended regions by using each of the quantity n of the extracted error region information 28 as explained with reference to FIG. 5. Afterwards, the combining unit 7 combines the extended regions after the generation and acquires a region in which the extended regions overlap one another as a combined region. The combining unit 7 performs this combining processing on every combination and acquires a quantity n*(n−1)/2 of combined regions (S5). The combining unit 7 stores the information relating to the acquired combined regions in the short-term storage unit 23 or the long-term storage unit 26 as the combined region information 70, as explained with reference to FIG. 6.

Here, the calculation method of the combined regions in S5 is described in detail with the examples of FIG. 4 and FIG. 5. At high latitudes, errors in the ratio of the length of a line of latitude to the length of a line of longitude become large. However, in the following description, it is assumed that the length of a line of latitude and the length of a line of longitude are closely related and are dealt with as being equal to one another.

When the central coordinate (latitude, longitude) of the error region 64A=($lat1, $lng1) and the inclination of the major axis of the error region 64A is represented by the increase $ tan 1 of the latitude per unit longitude, each of the parameters in a case of FIG. 4 is represented as below.

$lat1=35.582;
$lng1=139.642;
$ tan 1=tan(129);

The extended axis 66A of the error region 64A (coordinate of the center line of the extended region 67A ($lat_e1, $lng_e1)) is represented by the following equation.

$$\$lat\_e1=\$\tan 1*(\$lng\_e1-\$lng1)+\$lat1 \quad (1)$$

When the central coordinate (latitude, longitude) of the error region 64B=($lat2, $lng2) and the inclination of the major axis of the error region 64B is represented by the increase $ tan 2 of the latitude per unit longitude, each of the parameters in a case of FIG. 4 is represented as below.

$lat2=35.596;
$lng2=139.661;
$ tan 2=tan(43);

The extended axis 66B of the error region 64B (coordinate of the center line of the extended region 67B ($lat_e2, $lng_e2)) is represented by the following equation.

$$\$lat\_e2=\$\tan 2*(\$lng\_e2-\$lng2)+\$lat2 \quad (2)$$

The intersection of the extended axes 66A and 66B is a point at which $lat_e1=$lat_e2 and $lng_e1=$lng_e2 in the two equations (1) and (2) of the extended axis. When the points on the extended axis are mathematically represented with latitude x and longitude y, a solution of (x, y) that satisfies the following equations can be obtained.

$$y=\$\tan 1*(x-\$lng1)+\$lat1 \quad (3)$$

$$y=\$\tan 2*(x-\$lng2)+\$lat2 \quad (4)$$

Each of the equations (3) and (4) is divided by $ tan 1, $ tan 2, respectively, and the difference between the equations (3) and (4) is acquired.

$$(1/\$\tan 1-1/\$\tan 2)*y=(\$lat1/\$\tan 1)-(\$lat2/\$\tan 2)-\$lng1+\$lng2$$

Both sides of this equation are divided by (1/$ tan 1−1/$ tan 2) to obtain $$y=((\$lat1/\$\tan 1)-(\$lat2/\$\tan 2)-\$lng1+\$lng2)/(1/\$\tan 1-1/\$\tan 2);$$

Here, the latitude of the combined region: $lat_c is represented by the following equation.

$$\$lat\_c=y=((\$lat1/\$\tan 1)-(\$lat2/\$\tan 2)-\$lng1+\$lng2)/(1/\$\tan 1-1/\$\tan 2);$$

The longitude of the combined region $lng_c is applied to a calculation of the equation (1) of the extended axis in the error region 64A and the equation (2) of the extended axis in the error region 64B.

$$\$lng\_c=(\$lat\_c-\$lat1)/\$\tan 1+\$lng1 \quad \text{(equation (1))}$$

$$\$lng\_c=(\$lat\_c-\$lat2)/\$\tan 2+\$lng2 \quad \text{(equation (2))}$$

Consequently, the calculation result is obtained as below.
$lat_c=35.5798817669958
$lng_c=139.643715311265

The significant digit of the calculated $lat_c and $lng_c is made to be the same as that of the input value. As a result, values stored in "latitude" 72 and "longitude" 73 in FIG. 6 are obtained. In addition, the axis width 65A of the major axis direction 66A is stored in "axis width 1" 76. An inclination (angle) of the major axis 66A with respect to the longitude line is stored in "inclination 1" 77. The axis width 65B of the major axis direction 66B is stored in "axis width 2" 78. An inclination (angle) of the major axis 66B with respect to the longitude line is stored in "inclination 2" 79. As a result, the result in FIG. 6 is obtained.

Next, the area measurement unit 8 calculates an area Se of the combined region for each piece of combined region information (S6). The area Se of the combined region can be calculated by dividing the product of minor axis widths 65A and 65B of the two extended regions 67A and 67B illustrated in FIG. 5 by sine sin θ obtained from an intersection angle θ. Here, when the minor axis width 65A of the extended region 67A is represented as sa1 and the minor axis width 65B of the extended region 67B is represented as sa2, the area Se of the combined region is represented in the following equation.

$$Se=sa1 \times sa2/\sin \theta$$

The area comparison unit 9 extracts combined region information having an area equal to or smaller than a certain area SeMax from the quantity n*(n−1)/2 of the combined region information (S7). SeMax is included in the setting information 29 and is stored in the long-term storage unit 26 in advance. When the combined region information having an area equal to or smaller than a certain area SeMax is not extracted ("No" in S7), the processing proceeds to S9.

When the combined region information having an area equal to or smaller than a certain area SeMax is extracted ("Yes" in S7), the area comparison unit 9 adds the extracted combined region information 70 to a calculation target list (S8). The list of objects of calculation is stored in the short-term storage unit 23 or the long-term storage unit 26.

In addition, the area comparison unit 9 extracts the error region information having an area equal to or smaller than a threshold SeMax from the error region information 28 obtained in S1 (S9). When the error region information having an area equal to or smaller than the threshold SeMax is extracted (S10), the area comparison unit 9 adds the extracted error region information 28 to the list of objects of calculation (S11).

In the following description, the error region information 28 and the combined region information 70 that are added to the calculation target list are referred to as calculation target information. The error region and the combined region represented by the calculation target information are referred to as target regions.

The statistical processing unit 10 determines whether the calculation target information is included in the calculation target list or not (S12). When the statistical processing unit 10 determines that none of the calculation target information is included in the calculation target list ("No" in S12), the position estimation processing according to the present embodiment is not performed and this processing is terminated.

The statistical processing unit 10 performs the following processing when it determines whether the calculation target list includes one or more pieces of calculation target information or not ("Yes" in S12). In other words, the statistical processing unit 10 calculates a position of the median point in a cluster of central coordinates by using the central coordinates of target regions of the calculation target information in the calculation target list, and outputs the calculated position of the median point as a position estimation result (S13).

Here, when the center position vector of the error region in a range of i=1 to n is Vi, the median point vector Vresult can be obtained from the following equation.

$$V\text{result}=(\Sigma(i=1\sim n)Vi)/n$$

It should be noted that a detailed method of calculating the position of a median point is explained with reference to FIG. 8.

FIG. 8 illustrates an example of the statistical processing in the first embodiment. The statistical processing unit 10 calculates the summation LatSum of the lattitude Lat_i and the summation LngSum of the longitude Lng_i of the central coordinates of all the calculation target information included in the calculation target list (S1301).

The statistical processing unit 10 respectively divides the summation of the latitude LatSum and the summation of longitude LngSum by the number Num of the all calculation target information in the calculation target list (S1302). The statistical processing unit 10 obtains a coordinate (LatSum/Num, LngSum/Num) as a position of a median point (S1303). At that time, the coordinate (LatSum/Num, LngSum/Num) is represented in the following manner.

$$\left(\frac{\sum_{i=1}^{n} \text{lat\_i}}{n}, \frac{\sum_{i=1}^{n} \text{lng\_i}}{n}\right)$$

According to the present embodiment, the position estimation device 1 generates extended regions that are created by extending error regions represented as ellipses in a major axis direction based on the error information output from the position measurement sensor, and detects a region in which extended regions overlap with one another as combined regions. Afterwards, the position estimation device 1 calculates a median point of the center of the error region and the center of the combined region. As a result, even if there is one piece of uncertain information in the position of a median point obtained from plural calculation results, positions are collectively calculated to obtain statistically probable information so that the precision of positioning can be improved. In addition, the precision of the positioning result can be improved only by changing the position estimation method using a position estimation device without changing the operations of the positioning sensor.

It should be noted that in the flow in FIG. 7A and FIG. 7B, the entire position estimation processing is terminated when the first statistical processing is terminated. However, the activation of the positioning sensor 21 and the statistical processing may be periodically continued. The position estimation device 1 may change the activation of the position sensor 21, the period and frequency of statistical processing in accordance with the degree of importance, or the calculation processing load of other sensors. For example, for positioning in which a high precision is required, information with a higher precision can be obtained by frequently performing positioning processing to increase the calculation target information to be processed in the statistical processing. As another example, when another calculation load is higher than the calculation load in the statistical processing, the frequency of statistical processing may be decreased to reduce the overall calculation load.

In the present embodiment, a median point of a cluster of positions of error regions and combined regions is calculated by using the center of the error regions and the center of the combined regions. However, the calculation is not limited to this calculation. For example, statistical values such as a standard deviation, a weighted average, and a weighted standard deviation of the cluster of these positions may be calculated by using the center of the error regions and the center of the combined regions.

Furthermore, the present embodiment can be used to obtain the position of semi-fixed equipment in which a movement of location is less frequent than the frequency of the position measurement. For example, the present embodiment may be used in a case of tracking installation sites of a large printer on a long-term basis. As another example, the present embodiment may be used to track on a long-term basis equipment such as heavy machinery that is used at one construction site for a certain period of time and is then used at another site after the certain time period of construction.

Second Embodiment

The first embodiment estimates a positioning target position by combining extended regions created on the basis of ellipse-shaped error regions and obtaining a median point of a cluster of central coordinates of the combined regions in which the extended regions overlap one another and the central coordinate of the error region (target region). In contrast, the second embodiment estimates a positioning target position by calculating a median point after weighting the central coordinate or a coordinate of median point of each target region in accordance with the size, type, and the like of the area of the target region, or in other words in accordance with the reliability of errors. Variation of the weighting of the central coordinate of each target region includes, for example, the following examples.

In Example 1, a smaller weight is added to a target region with a larger area (=error), and such a target region is regarded as having a low reliability in terms of precision. On the other hand, a larger weight is added to a target region with a smaller area (=error), and such a target region is regarded as having a high reliability in terms of precision.

More specifically, when the position of a median point is calculated to obtain the ultimate result, the statistical processing unit 10 normalizes the coordinate of the median point by cumulatively adding quotient vectors obtained when the central coordinate of each target region is divided by the area of the target region and by ultimately dividing the cumulative addition by the sum of the inverse number of the area.

Here, the center position vector of the target region with $i=1$ to n is represented by $Vi$, and the area of the target region is represented by $Si$. Consequently, the measurement result Vresult is a value represented by the following equation.

$$V\text{result} = (\Sigma(i=1\sim n)Vi/Si)/(\Sigma(i=1\sim n)1/Si)$$

In the following description, more details of the processing in the statistical processing unit 10 are explained. It should be noted that since the configuration of the position estimation device of the present embodiment is similar to that of the first embodiment, the same reference code is added to the same component and the explanation of the component is omitted. Moreover, the present embodiment performs the same processing as the processing in the first embodiment, except for the statistical processing (S13).

Figure 9:
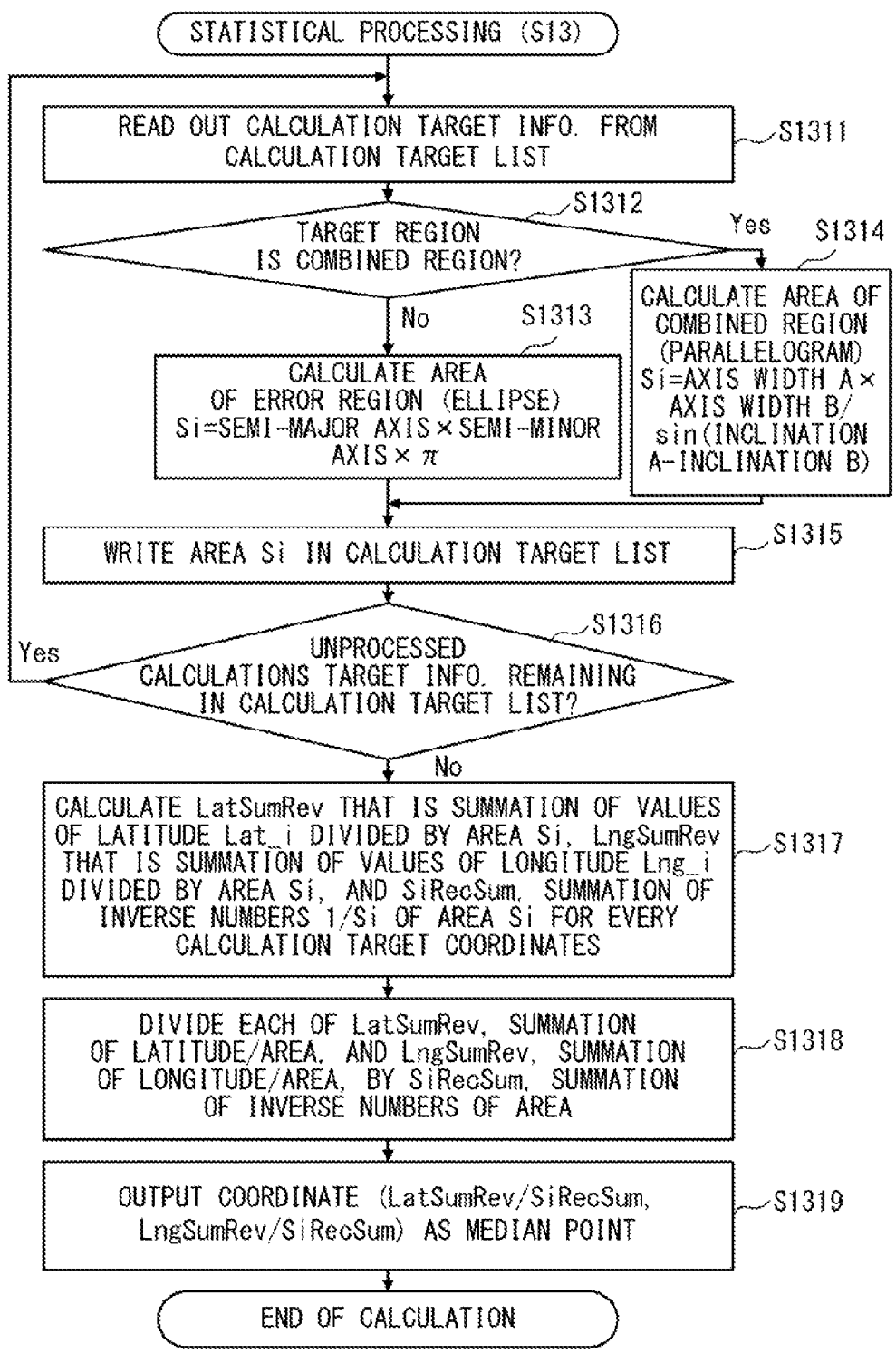
FIG. 9 illustrates statistical processing in the second embodiment (Example 1)

FIG. 9 illustrates statistical processing in the second embodiment (Example 1). The statistical processing unit 10 reads out a piece of calculation target information from the calculation target list (S1311). The statistical processing unit 10 determines whether the target region indicated by the readout calculation target information is a combined region or not (S1312). The determination of whether the target region is a combined region or not can be made from, for example, whether the data item (type) in the calculation target information is "combined" or not.

When the data item (type) in the calculation target information is "combined", the statistical processing unit 10 determines that the target region is a combined region ("Yes" in S1312). In this case, the statistical processing unit 10 calculates the area Si of the combined region (parallelogram) by using the following equation (S1314).

$$Si = |(\text{axis width 1}) \times (\text{axis width 2})/\sin(\text{inclination 1} - \text{inclination 2})|$$

When the data item (type) in the calculation target information is other than "combined", the statistical processing unit 10 determines that the target region is not a combined region ("No" in S1312). In this case, the statistical processing unit 10 calculates the area Si of the error region (ellipse) by using the following equation (S1313).

$$Si = (\text{semi-major axis}) \times (\text{semi-minor axis}) \times \pi$$

The statistical processing unit 10 associates the area Si calculated in S1313 or S1314 with the calculation target information in processing as illustrated in FIG. 10 and writes the area Si in the calculation target list (S1315).

The statistical processing unit 10 causes all the calculation target information included in the calculation target list to undergo the processing of S1311 to S1315 (S1316).

The statistical processing unit 10 divides the latitude Lat_i of the center position of each piece of calculation target information in the calculation target list by the area Si to calculate the summation LatSumRev of the quotients. The statistical processing unit 10 divides the longitude Lng_i of the center position of each piece of calculation target information in the calculation target list by the area Si to calculate the summation LngSumRev of the quotients. The statistical processing unit 10 also calculates the summation SiRecSum of the inverse number 1/Si of the area Si in each piece of calculation target information in the calculation target list (S1317).

The statistical processing unit 10, afterwards, respectively divides LatSumRev, the summation of the latitude/area, and LngSumRev, the summation of the longitude/area, by SiRecSum, the summation of the inverse number of the area (S1318).

The statistical processing unit 10 outputs the coordinates obtained as a result (LatSumRev/SiRecSum, LngSumRev/SiRecSum) as the coordinates of a median point (S1319). At that time, the coordinates of the median point (LatSumRev/SiRecSum, LngSumRev/SiRecSum) are represented by the following equation.

$$\left( \frac{\sum_{i=1}^{n} \text{lat\_i}/Si}{\sum_{i=1}^{n} 1/Si}, \frac{\sum_{i=1}^{n} \text{lng\_i}/Si}{\sum_{i=1}^{n} 1/Si} \right)$$

According to the present embodiment (Example 1), it is possible to add weight to the coordinates of a median point in a target region in accordance with the size of the area of the target region. As a result, the coordinates of a median point can be calculated in such a manner that the weight added to the coordinates of a median point is made heavier for the smaller area of a target region (smaller error), which is a highly reliable.

Next, Example 2 is explained. Example 2 adds different weights to the central coordinates of the error region obtained from the positioning sensor and to the median point coordinates of the combined region when a median point of a set of the center points/median points is acquired in Example 1. For example, in a case in which the error information directly acquired from the positioning sensor is to be emphasized, a weight twice that of the weight added to the combined region is added to the area of the error region acquired from the positioning sensor, and the median point is calculated by the method of Example 1.

Here, the center point vector acquired from the positioning sensor is represented as Vsi, and the area of the error region is represented as Ssi (i=1 to n). The center point vector of the combined region is represented as Vcj, and the area of the combined region is Scj (j=1 to m). The weight to the area of the error region acquired form the positioning sensor is represented as k, and the weight to the area of the combined region is represented as l. At that time, the measurement result Vresult becomes a value represented by the following equation. It should be noted that k and l are any positive real number.

$$V\text{result}=(\Sigma(i=1{\sim}n)Vsi/kSsi+\Sigma(j=1{\sim}m)Vcj/lScj)/(\Sigma(i=1{\sim}n)/kSi+\Sigma(j=1{\sim}m)/lScj)$$

Figure 11:
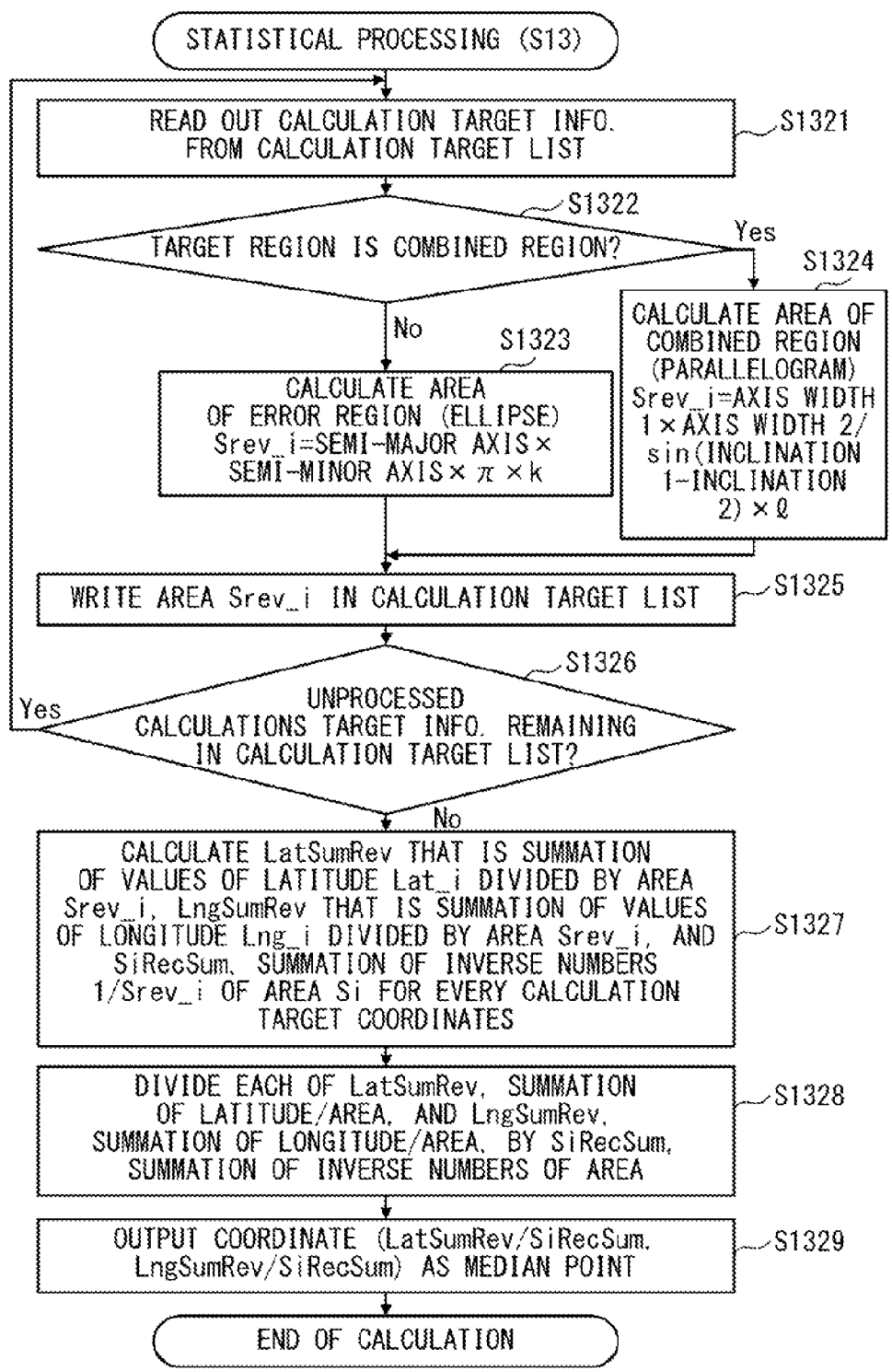
FIG. 11 illustrates statistical processing in the second embodiment (Example 2)

FIG. 11 illustrates the statistical processing in the second embodiment (Example 2). The statistical processing unit 10 reads out one piece of calculation target information from the calculation target list (S1321). The statistical processing unit 10 determines whether the target region indicated by the readout calculation target information is a combined region or not (S1322). The determination of whether the target region is a combined region or not can be made from, for example, whether the data item "acquisition type" in the calculation target information is "combined" or not.

When the target region is determined to be a combined region ("Yes" in S1322), the statistical processing unit 10 calculates an area Srev_i of the combined region (parallelogram) using the following equation (S1324). It should be noted that a weight l (l is any real number) is included in the setting information 29 and is stored in the long-term storage unit 26.

$$Srev\_i=(\text{axis width 1})\times(\text{axis width 2})/\sin(\text{inclination 1}-\text{inclination 2})\times l$$

When the target region is not a combined region ("No" in S1322), the statistical processing unit 10 calculates an area Srev_i of the combined region (ellipse) using the following equation (S1323). It should be noted that a weight k (k is any real number) is included in the setting information 29 and is stored in the long-term storage unit 26.

$$Srev\_i=(\text{semi-major axis})\times(\text{semi-minor axis})\times\pi\times k$$

The statistical processing unit 10 associates the area Srev_i calculated in S1323 or S1324 with the calculation target information in processing as illustrated in FIG. 12 and writes the associated area Srev_i in the calculation target list (S1325).

The statistical processing unit 10 causes all of the calculation target information included in the calculation target list to undergo the processing of S1321 to S1325 (S1326).

The statistical processing unit 10 divides the latitude Lat_i of the center position of each piece of calculation target information in the calculation target list by the area Srev_i to calculate the summation LatSumRev of the quotients. The statistical processing unit 10 divides the longitude Lng_i of the center position of each piece of calculation target information in the calculation target list by the area Srev_i to calculate the summation LngSumRev of the quotients. The statistical processing unit 10 also calculates the summation SiRecSum of the inverse number 1/Srev_i of the area Srev_i in each piece of calculation target information in the calculation target list (S1327).

The statistical processing unit 10, afterwards, respectively divides LatSumRev (the summation of the latitude/area), and LngSumRev (the summation of the longitude/area) by SiRecSum (the summation of the inverse number of the area) (S1328).

The statistical processing unit 10 outputs the calculated coordinate (LatSumRev/SiRecSum, LngSumRev/SiRecSum) as a coordinate of a median point (S1329). At that time, the coordinate of a median point (LatSumRev/SiRecSum, LngSumRev/SiRecSum) is represented by the following equation.

$$\left(\frac{\sum_{i=1}^{n}\text{lat\_i}/\text{Srev\_i}}{\sum_{i=1}^{n}1/\text{Srev\_i}},\frac{\sum_{i=1}^{n}\text{lng\_i}/\text{Srev\_i}}{\sum_{i=1}^{n}1/\text{Srev\_i}}\right)$$

According to the present embodiment (Example 2), it is possible to add weight to the central coordinates in a target region in accordance with the reliability of the acquisition source of the calculation target information. As a result, the coordinates of a median point can be calculated in such a manner that a heavier weight is given to the central coordinates of the target region having a smaller area and the weight is adjusted depending on whether the calculation target information is the error region information acquired from the positioning sensor or a combined region information.

Next, Example 3 is explained. In Example 3, when weight is added to the area of a combined region, the weight added to the area of the combined region is made larger for a combined region in which the total of the distances from the combined region and each of two error regions from which the combined region is generated is shorter.

Here, the center point vector of the error region, which is acquired from the positioning sensor, is represented as Vsi, and the area of the error region is represented as Ssi (i=1 to n). The center point vector of the combined region is represented as Vcj, and the area of the combined region is Scj (j=1 to m). The total of a distance between the center position Vsi of an error region A and the center position Vcj of the combined region and a distance between the center position Vsi of an error region B and the center position Vcj of the combined region is represented by Di (Di is a real number). At that time, the measurement result Vresult becomes a value represented by the following equation.

$$V\text{result}=(\Sigma(i=1{\sim}n)Vsi/Ssi+\Sigma(j=1{\sim}m)Vcj/DiScj)/(\Sigma(i=1{\sim}n)/(\Sigma(i=1{\sim}n)1/Ssi+\Sigma(j=1{\sim}m)1/DiScj)$$

Figure 13:
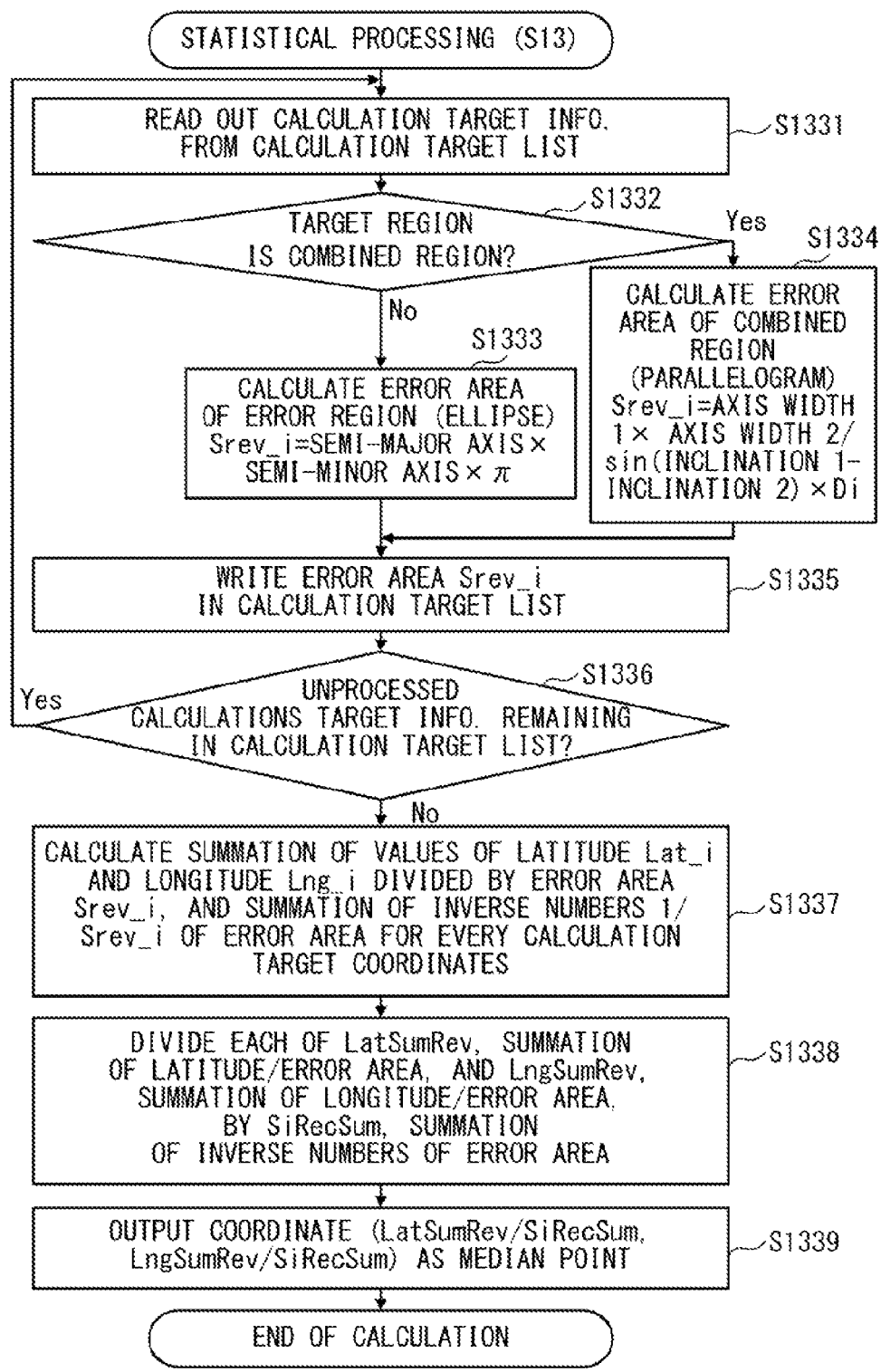
FIG. 13 illustrates statistical processing in the second embodiment (Example 3)

FIG. 13 illustrates the statistical processing in the second embodiment (Example 3). The statistical processing unit 10 reads out one piece of calculation target information from the calculation target list (S1331). The statistical processing unit 10 determines whether the target region indicated by the readout calculation target information is a combined region or not (S1332). The determination of whether the target region is a combined region or not can be made from, for example, whether the data item "acquisition type" in the calculation target information is "combined" or not.

When the target region is determined to be a combined region ("Yes" in S1332), the statistical processing unit 10 calculates an area Srev_i of the combined region (parallelogram) using the following equation (S1334).

Srev_i=(axis width 1)×(axis width 2)/sin(inclination 1−inclination 2)×Di

When the target region is not a combined region ("No" in S1332), the statistical processing unit 10 calculates an area Srev_i of the combined region (ellipse) using the following equation (S1333).

Srev_i=(semi-major axis)×(semi-minor axis)×π

The statistical processing unit 10 associates the area Srev_i calculated in S1333 or S1334 with the calculation target information in processing as illustrated in FIG. 14 and writes the associated area Srev_i in the calculation target list (S1335).

The statistical processing unit 10 causes all the calculation target information included in the calculation target list to undergo the processing of S1331 to S1335 (S1336).

The statistical processing unit 10 divides the latitude Lat_i of the center position of each piece of calculation target information in the calculation target list by the area Srev_i to calculate the summation LatSumRev of the quotients. The statistical processing unit 10 divides the longitude Lng_i of the center position of each piece of calculation target information in the calculation target list by the area Srev_i to calculate the summation LngSumRev of the quotients. The statistical processing unit 10 also calculates the summation SiRecSum of the inverse number 1/Srev_i of the area Srev_i in each piece of calculation target information in the calculation target list (S1337).

The statistical processing unit 10, afterwards, respectively divides LatSumRev (the summation of the latitude/area) and LngSumRev (the summation of the longitude/area) by SiRecSum, the summation of the inverse number of the area (S1338).

The statistical processing unit 10 outputs the calculated coordinate (LatSumRev/SiRecSum, LngSumRev/SiRecSum) as a coordinate of a median point (S1329). At that time, the coordinate of the median point (LatSumRev/SiRecSum, LngSumRev/SiRecSum) is represented by the following equation.

$$\left( \frac{\sum_{i=1}^{n} \mathrm{lat\_i}/\mathrm{Srev\_i}}{\sum_{i=1}^{n} 1/\mathrm{Srev\_i}}, \frac{\sum_{i=1}^{n} \mathrm{lng\_i}/\mathrm{Srev\_i}}{\sum_{i=1}^{n} 1/\mathrm{Srev\_i}} \right)$$

According to the present embodiment (Example 3), when weight is added to the area of a combined region in Example 1, it is possible to add a lighter weight for a combined region with a longer total of the distances from the combined region and each of two error regions from which the combined region is generated, and to add a heavier weight for a combined region with shorter total of the distances.

Third Embodiment

Of the acquired combined regions, only the combined regions in which the total of the distances from the combined region and two error regions from which the combined region is generated is a threshold Dmax or less (Dmax is any real number) may be a calculation target. It should be noted that in this embodiment, configurations that are the same as those in the first embodiment have the same reference codes as those in the first embodiment, and explanations of those configurations are omitted.

FIG. 15 illustrates an example of the configuration of the position estimation device in the third embodiment. The position estimation device in FIG. 15 has a distance measurement unit 90 added in the position estimation unit 4 in the position estimation device 1 in FIG. 2. The functions of the distance measurement unit 90 are explained using FIG. 16A and FIG. 16B.

Figure 16A:
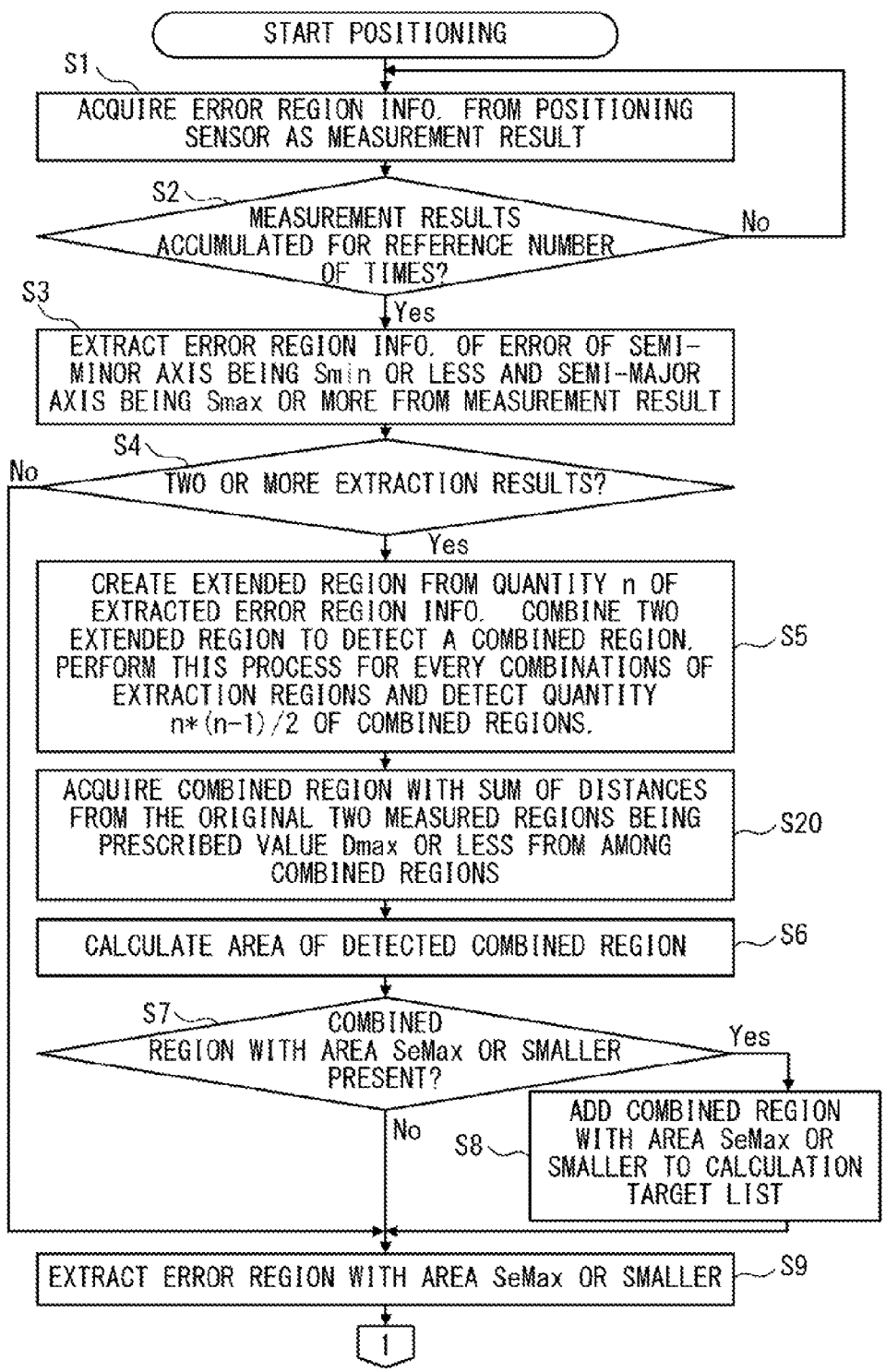
FIG. 16A illustrates a flow (1) of position estimation processing in the third embodiment.

FIG. 16A and FIG. 16B illustrate a flow of the position estimation processing in the third embodiment. FIG. 16A and FIG. 16B are similar to FIG. 7A and FIG. 7B, but have a processing of S20 added between the processing of S5 and the processing of S6.

After the processing in S5, the distance measurement unit 90 acquires, based on the combined region information acquired in S5, combined regions in which the sum of the distances from the combined region to the two error regions from which the combined region is generated is a threshold Dmax or smaller (S20). In other words, the distance measurement unit 90 performs the following processing for each piece of the combined region information acquired in S5. The distance measurement unit 90 calculates a distance Da between the center position indicated by the combined region information and the center position of an error region A. The distance measurement unit 90 also calculates a distance Db between the center position indicated by the combined region information and the center position of an error region B. The distance measurement unit 90, afterwards, calculates the sum Dab of the distance Da and the distance Db. The distance measurement unit 90 then acquires combined region information in which Dab is equal to or smaller than the threshold Dmax. It should be noted that Dmax is included in the setting information 29 and is stored in the long-term storage unit 26 in advance.

Afterwards, the area measurement unit 8 performs the processing of S6 for the combined region information acquired in S20. The processing subsequent to the above processing is the same as that of FIG. 7A and FIG. 7B, and therefore the explanation of the subsequent processing is omitted.

It should be noted that it is possible for the weighing explained in the second embodiment to be performed in the processing in S13 in the present embodiment.

According to the present embodiment, it is possible to extract from the acquired combined regions such combined regions that the distance between the combined regions and the error regions from which the combined regions are generated is within a certain range. As a result, combined region information with a highly reliable precision can be the calculation target.

According to the first to the third embodiments, it is possible to estimate a highly precise position from an output result of a position sensor with a low precision that has a large difference between the estimated error and the actual error. Therefore it is possible to obtain a more precise measurement result, or to obtain the same precision in the measurement from a fewer number of times performing measurements than that of the measurements which do not employ the present embodiment.

It should be noted that although the first to the third embodiments perform the processing of the position estimation unit in two dimensions, it is possible to apply the processing of the position estimation unit to three dimensions.

According to the first to the third embodiments, the position estimation program that estimates a position of a positioning target causes a computer to execute the following processing. A positioning unit outputs error region information indicating an ellipse-shaped error region represented by a position acquired from positioning performed after receiving a signal from a plurality of transmitters and a measurement error of the position. The computer extends the error region indicated by each piece of the acquired error region information acquired from the positioning unit in a major axis direction. The computer estimates the position of the positioning target based on an intersection region in which the extended error regions intersect with one another.

With this configuration, a more precise estimation of the position of the positioning target is made possible by effectively utilizing the measurement error information.

The position estimation program, in the estimating the position of the positioning target, assigns the error region and the intersection region as a target region, performs statistical processing of a plurality of coordinates indicating positions of the target regions, and outputs the coordinates acquired as a result of the statistical processing as an estimated position of the positioning target.

With this configuration, it is possible to acquire a more accurate current position from plural pieces of position information including errors by using a limited quantity of positioning results acquired from a positioning sensor. In other words, because statistical processing can be performed by using an intersection region in addition to the error region acquired from the measurement result, the number of samples for the statistical processing with respect to the number of times of positioning increases, and as a result the precision of the estimated position is improved.

The position estimation program further causes the computer to execute processing of extracting error region information with a proportion of a semi-major axis to a semi-minor axis of the error region being a first threshold or more from the acquired error region information. When the error region is to be extended, the computer extends the error region of the extracted error region information in a major axis direction.

This configuration allows for processing of error region information having an error region with an ellipse shape elongated to a certain extent (i.e., the major axis is longer than the minor axis in a certain proportion or more).

In the statistical processing, a median point of a cluster of coordinates of median points of the target regions is calculated and the calculated median point is output as the estimated position.

With this configuration, it is possible to acquire an estimated position by obtaining an average of a cluster of coordinates of median points in the target areas.

In the statistical processing, heavier weight is added to the coordinates of median point of each of the target regions for the target regions with smaller area, and a median point of a cluster of coordinates of median points of the weighted target regions is calculated.

With this configuration, it is possible to acquire an estimated position in accordance with the area of each median point (error range), which indicates the reliability of the median point, by adding weight to the median point.

Although the above description provided an explanation of extending error regions, the regions do not always have to be extended. Coordinates output from a GPS, which is the positioning unit, and an angle of the major axis error direction may be used to obtain an intersection. Since the intersection region acquisition unit can acquire an intersection from two sets of information, a coordinate and an angle, the estimation unit may acquire a coordinate of the estimated position from this intersection. The method of acquiring coordinates in the estimation unit may be calculation by using the lease-square method, as in coordinate calculation in a commonly used GPS.

The calculation using the least-square method carries out an operation using a tentative latitude and longitude. The calculation using the least-square method obtains a squared value of a distance between a straight line extending in a major axis error direction from a central coordinate and the tentative latitude and longitude and a squared value of a distance between the other similar straight line and the tentative latitude and longitude. The calculation using the least-square method obtains the sum of these squared values. The calculation using the least-square method changes the value of the tentative latitude and longitude, and repeats the same operation to search out a value of latitude and longitude that makes the smallest sum of the squared values. The number of times to repeat the operation has an upper limit, and the operation is ended when the upper limit is reached, and a value of latitude and longitude with the smallest sum is output as a calculated value.

It should be noted that the error information commonly used in GPS refers to a value substituted with an error distance with reference to a statistically obtained conversion table based on the deterioration information calculated at the time of acquiring position information, and has a different meaning than the commonly used term "error". Accordingly, in the embodiments, the term "error" is used as the commonly used term in handling GPS information, and the error described in the embodiments refers to information representing uncertainty, which is a synonym for degradation information.

In a case of using degradation information before converting it into errors, the degradation information may be converted into error information from the ultimately obtained degradation information with reference to the conversion table. It should be noted that the conversion table can be obtained from a result of positioning with a GPS that can acquire an exact position. The error information can be obtained by calculating the distance between the position acquired as a result of GPS positioning and the exact position. A number of pieces of data that allows for statistical processing of the calculated error information and the degradation information are gathered. The conversion table is created by obtaining an average distance of the error information distributed for each piece of degradation information.

It should be noted that the degradation information was explained as degradation over time, but it may be degradation information determined by a geometric arrangement relationship of the received reference stations. For example, when a positioning sensor receives signals from two reference stations which form an angle of 90 degrees with respect to the positioning sensor as the vertex, or when a positioning sensor receives signals from three reference stations which are placed around the positioning sensor at angles of 120 degrees to each other with respect to the positioning sensor as the vertex, the degradation information determined by the geometric arrangement relationship becomes small.

On the other hand, the degradation information does not become small if signals are received from a number of reference stations with the position of each reference station being in approximately the same direction away from the positioning sensor, or with the reference stations positioned at two sites and the angle between the two sites being 180 degrees with respect to the positioning sensor as the vertex. In this case, the degradation information determined in the geometric arrangement relationship is calculated by separating the major axis and minor axis to calculate as described in the embodiments. In a direction in which no reference station is placed, the position information becomes more uncertain, and the degradation information of the major axis is calculated.

As the angle at which no reference station is placed and no accurate information is acquired becomes wider, the value of the degradation information of the major axis becomes more unfavorable. The angle indicating the direction of a major axis is considered to be more precise as the value of the degradation information of the minor axis becomes favorable, resulting in an increase in the precision of the newly acquired coordinates.

According to the technology described in this specification, it is possible to estimate a position of a positioning target with a high precision by effectively using measurement error information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a position estimation program for causing a computer to execute a process for estimating a position of a positioning target, the process comprising:
   acquiring a plurality of pieces of error region information acquired by positioning performed plural times, by using a positioning unit to output the error region information indicating an ellipse-shaped error region represented by a position acquired from positioning performed after receiving a signal from a plurality of transmitters and a measurement error of the position,
   extending the error region indicated by each piece of the acquired error region information in a major axis direction, the error region having a proportion of a semi-major axis to a semi-minor axis equal to or greater than a first threshold and
   estimating the position of the positioning target based on an intersect region in which the extended error regions intersect with one another.

2. The non-transitory computer-readable recording medium according to claim 1, wherein
   the estimating performs statistical processing of a plurality of coordinates, each indicating a position of a target region that is the error region and the intersect region, and outputs the coordinates acquired as a result of the statistical processing as an estimated position of the positioning target.

3. The non-transitory computer-readable recording medium according to claim 1, the process further comprising:
   extracting error region information with the proportion of the semi-major axis to the semi-minor axis of the error region equal to or greater than the first threshold from the acquired error region information,
   wherein the extending extends the error region of the extracted error region information in a major axis direction.

4. The non-transitory computer-readable recording medium according to claim 2, the process further comprising:
   extracting an intersect region in which an area of the intersect region is equal to or smaller than a second threshold,
   wherein the statistical processing defines the error region and the extracted intersect region as the target region.

5. The non-transitory computer-readable recording medium according to claim 2, wherein
   the statistical processing calculates a median point of a cluster of coordinates of median points of the target regions and outputs the calculated median point as the estimated position.

6. The non-transitory computer-readable recording medium according to claim 5, wherein
   the statistical processing adds a heavier weight to the coordinates of median points of each of the target regions for the target regions with a smaller area, and calculates a median point of a cluster of coordinates of median points of each of the weighted target regions.

7. The non-transitory computer-readable recording medium according to claim 6, wherein
   the statistical processing calculates the median point of the cluster of coordinates of median points of each of the target regions by dividing a coordinate of a median point of each of the target regions by each area of the target regions and summing results of the dividing, and dividing the summing by a summation of inverses of areas of the target regions.

8. The non-transitory computer-readable recording medium according to claim 6, wherein
   the statistical processing adds weight by multiplying the area of the target regions by m (m: any real number) when the target regions are the error region, and adds weight by multiplying the area of the target regions by n (n: any real number) when the target regions are the intersect region, and calculates the median point of a cluster of coordinates of median points of each of the target regions by dividing a summation of values of coordinates of median points of the target regions divided by an area of the weighted target, by a summation of inverses of areas of the weighted target regions.

9. The non-transitory computer-readable recording medium according to claim 5, wherein
   the statistical processing adds a heavier weight to the coordinates of median points of each of the target regions for the target regions with a smaller total value of distances between the intersect region and two error regions that are the basis of the intersect region when the target regions are the intersect region, and calculates the median point of a cluster of coordinates of median points of each of the target regions.

10. The non-transitory computer-readable recording medium according to claim 2, the process further comprising:
    extracting, when the target regions are the intersect region, the intersect region with the total of distances between the intersect region and the two error regions that are the basis of the intersect region being a third threshold or smaller, wherein the statistical processing defines the error region and the extracted intersect region as the target region.

11. A position estimation device for estimating a position of a positioning target, the position estimation device comprising:
    a positioning unit configured to perform positioning a plurality of times by receiving a signal from a plurality of transmitters and to generate error region information indicating an ellipse-shaped error region represented by a position acquired by the positioning and a measurement error of the position;

an extension processing unit configured to extend the error region indicated by the generated error region information in a major axis direction the error region having a proportion of a semi-major axis to a semi-minor axis equal to or greater than a first threshold;

an intersect region acquisition unit configured to acquire an intersect region at which the extended error region intersects with another extended error region; and an estimation unit configured to estimate the position of the positioning target based on the intersect region at which the extended error region intersects with another extended error region.

12. The position estimation device according to claim 11, wherein the estimation unit assigns the error region and the intersect region as a target region, performs statistical processing of a plurality of coordinates, each indicating a position of the target region, and outputs the coordinates acquired as a result of the statistical processing as an estimated position of the positioning target.

13. The position estimation device according to claim 11, the position estimation device further comprising:

a first extraction unit configured to extract information error region information with a proportion of a semi-major axis to a semi-minor axis of the error region being a first threshold or more from the generated error region.

14. The position estimation device according to claim 12, the position estimation device further comprising:

a second extraction unit configured to extract an intersect region with an area of the intersection area being a second threshold or smaller, wherein the estimation unit assigns the error region and the extracted intersect region as the target region.

15. A position estimation method of estimating a position of a positioning target, the position estimation method comprising:

acquiring, by using a computer, a plurality of pieces of error region information acquired from positioning performed plural times using a positioning unit to output the error region information indicating an ellipse-shaped error region represented by a position acquired from positioning performed by receiving a signal from a plurality of transmitters and a measurement error of the position;

extending, by using the computer, the error region indicated by each piece of the acquired error region information in a major axis direction, the error region having a proportion of a semi-major axis to a semi-minor axis equal to or greater than a first threshold, and estimating, by using the computer, the position of the positioning target based on an intersect region in which the extended error regions intersect with one another.

16. A position estimation device for estimating a position of a positioning target, the position estimation device comprising:

a positioning unit configured to perform positioning by receiving a signal transmitted from a transmitter and to generate a position acquired by the positioning, degradation information of the position, and an angle of the degradation information in a major axis;

an intersect region acquisition unit configured to acquire a plurality of pieces of information on the position and the angle from the positioning unit and to acquire an intersect region at which a plurality of pieces of line information specified on the basis of the degradation information and the acquired plurality of pieces of information on the position and the angle intersect with one another;

an extending unit configured to extend the error region indicated by each piece of the acquired error region information in a major axis direction, the error region having a proportion of a semi-major axis to a semi-minor axis equal to or greater than a first threshold; and an estimation unit configured to estimate the position of the positioning target based on the intersect region acquired in the intersect region acquisition unit.

* * * * *